(12) United States Patent
Hänsel et al.

(10) Patent No.: US 6,251,320 B1
(45) Date of Patent: Jun. 26, 2001

(54) PROCESS FOR PRODUCING A COVER SKIN FOR THE INSTRUMENT PANEL OF A MOTOR VEHICLE

(75) Inventors: Bruno Hänsel, Grafschaft; Jürgen Moitzheim, Königswinter, both of (DE)

(73) Assignee: Kautex Textron GmbH & Co. KG., Bonn (DE)

( * ) Notice: Subject to any disclaimer, the term of this patent is extended or adjusted under 35 U.S.C. 154(b) by 0 days.

(21) Appl. No.: 09/350,828

(22) Filed: Jul. 9, 1999

(30) Foreign Application Priority Data

Jul. 18, 1998 (DE) .............................. 198 32 469

(51) Int. Cl.[7] .......................... B29C 44/06; B29C 47/06; B29C 49/04
(52) U.S. Cl. ...................... 264/46.1; 164/45.9; 164/157; 164/209.3; 164/210.2; 164/564
(58) Field of Search ................................ 264/45.9, 46.1, 264/564, 157, 209.3, 210.2

(56) References Cited

U.S. PATENT DOCUMENTS

| | | | |
|---|---|---|---|
| 4,123,589 | * 10/1978 | Korlatzki et al. | 264/564 |
| 4,149,839 | 4/1979 | Iwawaki et al. | 425/133.1 |
| 4,424,834 | 1/1984 | Sumi et al. | 138/121 |
| 4,874,649 | * 10/1989 | Daubenbuchel et al. | 264/46.1 |
| 5,051,310 | * 9/1991 | Horn et al. | 428/423.3 |
| 5,055,525 | * 10/1991 | Henton et al. | 525/66 |
| 5,068,138 | * 11/1991 | Mitchell et al. | 264/564 |
| 5,169,464 | * 12/1992 | Foldesy et al. | 264/151 |
| 5,218,058 | 6/1993 | Zeitler et al. | 525/453 |
| 5,328,651 | * 7/1994 | Gallagher et al. | 264/45.9 |
| 5,431,435 | * 7/1995 | Wilson | 280/728.3 |
| 5,447,328 | * 9/1995 | Iannazzi et al. | 280/728.3 |
| 5,759,661 | 6/1998 | Ang et al. | 428/76 |
| 5,910,284 | * 6/1999 | Dressler | 264/564 |

FOREIGN PATENT DOCUMENTS

| | | |
|---|---|---|
| 26 01 815 | 1/1976 | (DE) . |
| 26 01 815 | 9/1976 | (DE) . |
| 31 43 994 | 5/1983 | (DE) . |
| 32 36 308 | 5/1983 | (DE) . |
| 39 16 874 | 5/1989 | (DE) . |
| 39 16 874 | 11/1990 | (DE) . |
| 196 14 091 | 10/1997 | (DE) . |
| 0 401 982 | 12/1990 | (EP) . |
| 0 427 104 | 5/1991 | (EP) . |
| 94/09965 | 5/1983 | (WO) . |

OTHER PUBLICATIONS

"Faltenbälge durch Extrusionsblasen fertigen", Abstract from German magazine, publishe 1983.
FaltenBälge durch Extrusionsblasen fertigen, Industrie–Anzeiger No. 62/63, 1983, 105th year, p. 26.
Fein, Kunz: *Neue Konstr.–möglichkeiten mit Kunststoff*, Part 7, Chapter 6.4, pp. 11, 12 (WEKA Fachverlag für techn. Führungskräfte GmbH), Feb. 1993.

\* cited by examiner

*Primary Examiner*—Allan R. Kuhns
(74) *Attorney, Agent, or Firm*—Drinker Biddle & Reath LLP (57) ABSTRACT

In a process for producing a cover skin of thermoplastic polyurethane for the instrument panel of a motor vehicle, a preform is produced from thermoplastic polyurethane by extrusion and is thereafter expanded by increased internal pressure in a blow molding mold.

20 Claims, 5 Drawing Sheets

PROCESS FOR PRODUCING A COVER SKIN FOR THE INSTRUMENT PANEL OF A MOTOR VEHICLE

FIELD OF THE INVENTION

The invention concerns a process for producing a cover skin for the instrument panel of a motor vehicle.

BACKGROUND OF THE INVENTION

A motor vehicle usually has an instrument panel, which can also be referred to as a dashboard, extending beneath the windshield at the front part of the passenger compartment of such a nature that the structure involves a support body which carries the necessary instruments and fittings and which can extend for example in the region in front of the front seats over almost the entire width of the vehicle. The support body is covered by a separately produced skin or covering which is adapted to the contour of the support body and which at least predominantly comprises thermoplastic polyurethane. The gauge of the cover skin does not exceed or only slightly exceeds a dimension for example of 1 mm. That skin is not self-supporting and can therefore be changed in shape virtually without limitation.

Covers of a skin or film configuration of that kind can be produced by a process referred to as the slush process in which thermoplastic polyurethane in powder form is introduced into a mold of suitable configuration in which, while being heated, it is distributed over the surface of the mold by a biaxial fling movement or by other suitable movements, being raised to the melting temperature. The powder which is distributed in the form of a uniform layer over the inside surface of the mold gels due to the increase in temperature thereof so that the individual particles of the powder combine together to form a continuous wall portion or skin which, after adequate cooling, is then removed from the mold and subjected to suitable cutting operations to put it into the appropriate shape required for it to be mounted on the holding arrangement for the instruments. That process is extremely time-consuming and therefore expensive, in particular by virtue of the fact that between three and seven minutes are required for an operating cycle for the production of such a cover skin, depending on the size of the cover skin to be produced.

Having regard to the extremely large numbers in which cover skins of that kind are required, there is an urgent need for a more economical production process.

SUMMARY OF THE INVENTION

An object of the present invention is to provide a process for producing a cover skin for a motor vehicle instrument panel in large numbers and economically, with ease of adaptability of the product configuration.

Another object of the present invention is to provide a process for producing a cover skin for a motor vehicle instrument panel which is such that it can be employed for producing the cover skin virtually irrespective of the extent of the instrument panel generally transversely with respect to the longitudinal axis of the motor vehicle and thus irrespective of the length of the cover skin.

Still another object of the present invention is to provide a process for producing a cover skin of thermoplastic polyurethane for a motor vehicle instrument panel, which permits the cover skin produced to be of any suitable length of between about 0.8 meter and 1.80 meter.

Yet a further object of the present invention is to provide a process for producing a cover skin for a motor vehicle instrument panel such that the result can satisfy virtually all reasonable demands in terms of quality and more specifically capacity to withstand mechanical loadings, appearance and other properties required for the intended function.

Yet a further object of the present invention is to provide a process for producing a cover skin of thermoplastic polyurethane for an instrument panel for a motor vehicle, which is at least comparable to the cover skins produced by the above-mentioned slush process.

Yet another object of the present invention is a process for producing a cover skin for a motor vehicle instrument panel such that the resulting cover skin can be soft and elastic as required.

In accordance with the present invention the foregoing and other objects are attained by a process for producing a cover skin of thermoplastic polyurethane for an instrument panel for a motor vehicle, wherein firstly a preform is produced by extrusion from thermoplastic polyurethane and thereafter the preform is expanded in a blow molding mold by an increased internal pressure in the preform.

It has been found that, although thermoplastic polyurethane cannot be readily processed using an extrusion blow molding procedure, production of the cover skins is possible in spite of the requirements which are unfavourable in regard to that procedure, more especially in terms of the dimensions, namely length and thin gauge, large diameter of the preform, and the expanded product to be produced therefrom, such production being considerably more economical than when using the conventional procedures in which the hollow body produced in the blow molding mold is normally required to undergo a finishing operation in order to arrive at the desired end product.

In this respect, the process can be particularly economical by producing in the blow molding mold a hollow body which constitutes a plurality of cover skins for respective instrument panels, so that the hollow body is divided up into the respective individual cover skins by suitable dividing processes such as cutting operations. It will be appreciated that this requires a blow molding mold of appropriate size. Nonetheless, the increased costs that this entails do not constitute a disadvantage, having regard to the large numbers in which cover skins of this kind are required. The blow-molded hollow body can be such that it comprises first and second portions which after a cutting operation represent respective cover skins, and, between the first and second portions, a region which represents waste or surplus and which consequently defines a spacing between the two portions for constituting the respective cover skins, on the inflated hollow body, prior to the hollow body being cut into the respective portions for affording the respective cover skins. That region representing waste on the blow-molded hollow body also takes account of the fact that the boundary edges of the end products may extend in an irregular configuration.

In order to take account of the particular features and aspects of thermoplastic polyurethane, it is advantageous for the processing procedure, that is to say including plasticising and shaping the starting material to constitute the preform, to be implemented under specific conditions in terms of for example pressure and temperature, with the starting material desirably being introduced in granule form into the extruder for extrusion of the preform. More particularly, in accordance with a preferred feature of the invention, it is advantageous for the preform which can be of a length of 1.80 m or more, to be produced by means of discontinuous extrusion which is known in relation to plastic processing operations, wherein the plasticised material is firstly conveyed into a storage space or chamber and then expelled by means of a piston or some other suitable manner in the form of a tubular portion through the generally annular outlet opening of the extrusion head. In that respect, the endeavour is for the preform to be extruded within a short period of time, for example within a period of one minute or less, with a preform length of between 1.30 m and 1.80 m. That has the advantage that the very thin-walled preform, the wall thickness or gauge of which can be about 2 mm, is subjected to a loading under its own weight by virtue of hanging from the extrusion head, only for a short period of time, and thus reaches the required length before it could uncontrolledly tear away under the effect of its own weight and the tensile loading applied thereto as a result. It has been found particularly advantageous in accordance with a preferred feature of the invention for the preform comprising thermoplastic polyurethane to be extruded at a speed of between about 10 and 40 cm/second, more particularly between about 10 and 35 cm/second, for example between about 10 and 25 cm/second. The production of a preform of a length of about 180 cm then lasts about 10 seconds or less.

In accordance with a preferred feature in that respect plasticisation in the extruder is effected at a temperature in the range of between 165° C. and 200°.

It may also be advantageous for the extruder including its extrusion head to be of such a design that, particularly within the extruder and the extrusion head, regions and parts are avoided, in which or by which a shearing action may be applied to the plastic material flowing thereat. At any event a shearing loading of the plastic material in that way when it is being processed should be reduced to the lowest possible extent or should be kept as brief as possible.

In accordance with a preferred feature of the invention an aliphatic polyurethane is used, which is resistant to UV-rays.

In a preferred configuration of the process according to the invention, a preform is produced having an at least two-layer wall structure and each layer of the wall structure comprises thermoplastic polyurethane and the at least two layers differ from each other by virtue of the properties of the polyurethanes forming them. Thus, it may be desirable for the arrangement to be such that the one layer, for example the outer layer, of the cover skin comprises aliphatic polyurethane and another layer, being for example the inner layer, comprises aromatic polyurethane. As aliphatic polyurethane is resistant to UV-radiation, an arrangement of that kind would enjoy the advantage that the cover skin does not change under the effect of UV-radiation. The use of aromatic polyurethane for the inner layer of the cover skin would have the advantage of affording lower costs as aromatic polyurethane is generally markedly cheaper than aliphatic polyurethane. The total thickness of the two layers of the finished product does not need to be greater than would be the case with a single-layer cover skin of polyurethane. Thus the outer layer may be between 0.2 and 0.6 mm in thickness while the inner layer may be between 0.8 and 1.8 mm in thickness with the total thickness of the two layers being for example 1 mm.

The production of an at least two-layer preform presupposes the use of a co-extrusion procedure which requires an extrusion apparatus having at least first and second extruders, more specifically one for each kind of material. In general, when using discontinuous extrusion, it will be advantageous to associate with each extruder its own specific storage space or chamber which is emptied by the action of a piston. The screw of the respective extruder can be used for that purpose in known manner, in which case the screw would then have to be mounted in such a way as to be displaceable. In general terms however it will be more appropriate to associate with each storage space or chamber a particular ejection means, for example an annular piston. That structure is also generally known and for that reason does not need to be discussed in greater detail herein.

As the procedure adopted is frequently such that the thin cover skin is backed with a thin layer of foam material in order to compensate for example for unevenness of and irregularities in the support body to which the cover skin is fitted or to provide the surface of the cover skin with a 'soft feel', it may also be desirable, when using the extrusion blow molding process for producing such a cover skin, to implement a co-extrusion operation in such a way that an at least two-layer preform is extruded in known manner, of which one layer comprises thermoplastic polyurethane and another layer comprises a plastic material, for example polyethylene, but possibly also thermoplastic polyurethane, having a component by which that plastic material is caused to foam up. That foaming effect generally occurs after the plastic material issues from the opening of the extrusion head as, before that, the pressure obtaining in the extrusion system prevents the material from foaming up.

If necessary the wall of the preform may also have an additional layer which is arranged as a bonding agent layer between the layer of polyurethane and the foamable material in order to bond those two layers together. In that case it would be necessary also to provide a particular extruder and possibly also a particular storage space or chamber for the bonding agent layer.

It will be appreciated that an additional foamed layer may also be provided if, as already described hereinbefore, the actual cover skin comprises first and second polyurethane layers. In that case, if necessary with the interposition of a bonding agent, the foamed layer could then be applied to the layer of aromatic polyurethane.

It will be appreciated that in this respect also it accordingly means that the number of extruders depends on the number of layers of different materials in the preform and in the product to be produced therefrom.

When using the co-extrusion procedure for applying a foamed layer to the back of the cover skin, it is possible to save on a special working step by which a foam layer is subsequently applied between the thin polyurethane skin and the support body.

In other respects, applying a foamed layer by means of co-extrusion can also contribute to stabilising the preform as, depending on the thickness relationships and the nature of the material constituting the layer of foam on the preform, the preform, that is to say more particularly the normal polyurethane layer thereof, of a thickness of for example 2 mm, experiences a stabilisation effect such that the problems which occur when extruding polyurethane are alleviated as the stability and strength of the preform which hangs from the extrusion head and which is possibly engaged by a gripping device for transporting it to the blow molding mold do not depend exclusively on the properties, which are crucial in that respect, of the thermoplastic polyurethane.

Further objects, features and advantages of the invention will be apparent from the following description of preferred embodiments.

DESCRIPTION OF PREFERRED EMBODIMENTS

Figure 1:
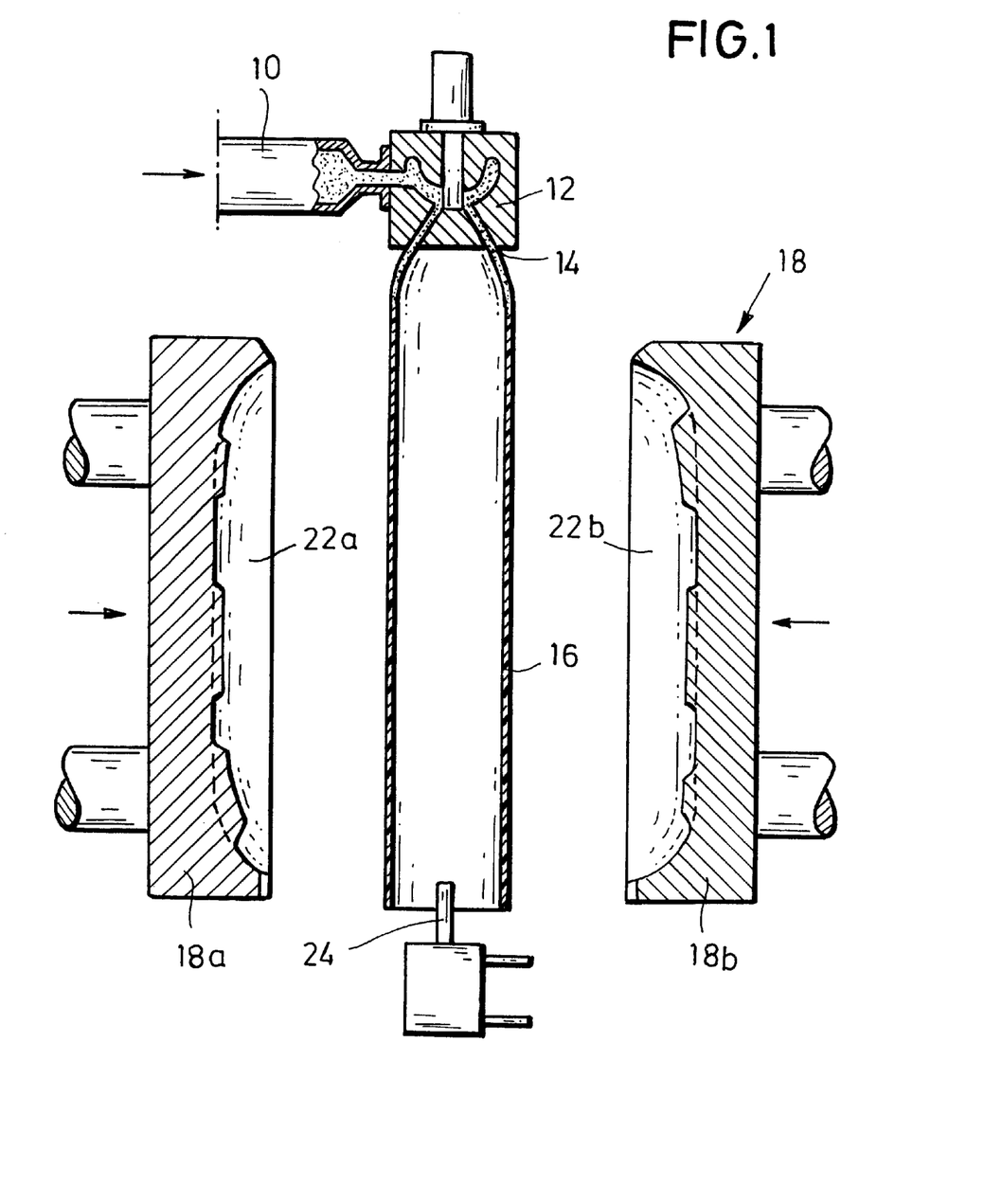
FIG. 1 is a partly sectional front view illustrating parts of an extrusion blow molding apparatus with an extruded preform between portions of an opened blow molding mold.

Reference will firstly be made to FIG. 1 illustrating a first stage in the operating procedure for producing a cover skin or shell of thermoplastic polyurethane for an instrument panel for a motor vehicle. FIG. 1 thus diagrammatically shows an extrusion blow molding apparatus which is provided in the usual manner with an extruder diagrammatically indicated at 10 and an extrusion head 12 mounted to the extruder 10. The extruder 10 and the extrusion head 12 constitute an extrusion system provided with at least one storage space or chamber (not shown) into which material is conveyed by the extruder 10 which in the usual way is provided with a screw (also not shown). As soon as the amount of material required for producing a preform has accumulated in the storage space or chamber, the storage space or chamber is emptied by any suitable means, generally by a piston. When that happens, the thermoplastic material is extruded through an annular discharge opening 14, forming a tubular preform indicated at 16. In general it is desirable and possible for the preform 16 to be extruded directly between the first and second portions indicated at 18a and 18b of a blow molding mold 18 which is illustrated in the open condition in FIG. 1 and which is disposed beneath the extrusion head 12. The blow molding mold 18 can be divided into two halves, although that is not necessarily the case. Thus, the blow molding mold could also be subdivided in an asymmetrical configuration if the procedure involves the simultaneous production of two end products which are different from each other.

Figure 2:
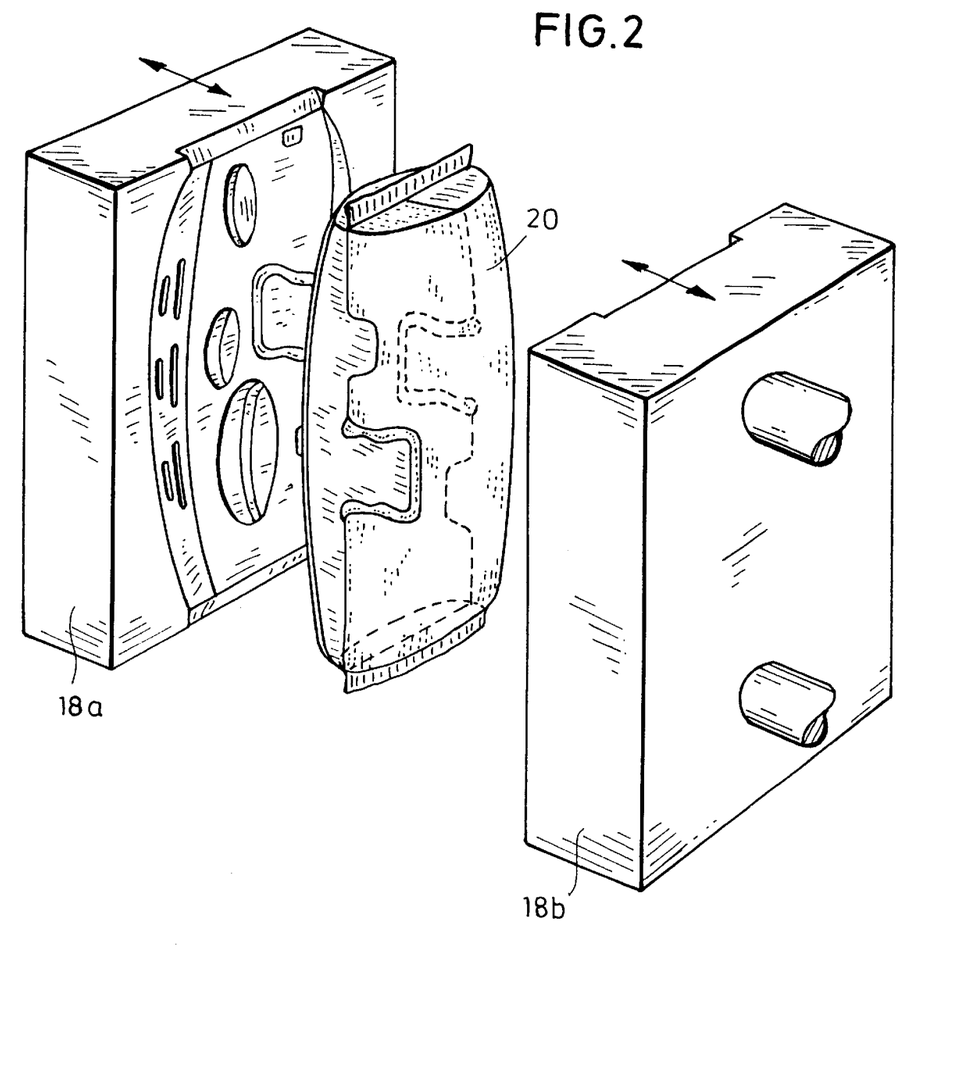
FIG. 2 is a perspective view of the blow molding mold in the opened condition with a blow-molded hollow body disposed therebetween after having been produced by expansion of the preform of FIG. 1.

The preform 16 involves a wall thickness or gauge of for example 2 mm which is reduced in the course of the operation of expanding the preform 16 by virtue of a corresponding stretching effect so that the expanded hollow body 20 which is shown in FIG. 2 and the configuration of which corresponds to that of the mold cavity indicated at 22a and 22b is of a wall thickness or gauge of for example 1 mm. When processing thermoplastic material, the procedure involved is desirably such that the material which issues from the extrusion head 12 is at a temperature of from about 165° C. to 200° C. That applies both for polyether polyurethane and also for polyester polyurethane which can both be extruded in the required length and with the relatively small wall thickness under the specified conditions, that is to say in particular with continuous extrusion. with the shortest possible extrusion times, and with the preform being received by the blow molding mold as directly as possible after the extrusion step.

As soon as the preform 16 has reached its length required for production of the inflated article indicated at 20 in FIG. 2, the blow molding mold 18 is closed by the two blow molding portions 18a and 18b being moved together. When that is done, at the same time the preform is closed by squeeze edges provided at suitable locations at the mutually facing faces of the blow molding mold portions 18a and 18b. The effect of those squeeze edges is to close the preform 16 completely at its upper end and only partly at its lower end, leaving at that location an opening through which a blowing nozzle indicated at 24 in FIG. 1 can be introduced into the preform 16 for the supply of compressed air into the interior thereof, to cause the preform 16 to be expanded within the blow molding mold 18.

The actual blow molding procedure is generally known so that it does not need to be described in detail herein. Thus for example, expansion of the preform 16 can already be commencing in the course of the closure movement of the blow molding mold 18. At any event after the blow molding mold 18 is completely closed the preform 16 is expanded therewithin by virtue of the increased internal pressure in the preform 16, until the outside surface of the preform 16 bears against the internal wall surface of the mold cavity 22a, 22b, thus constituting the external configuration of the hollow body 20. The wall of the mold cavity 22a, 22b may be such that it forms markings on the hollow body, for dividing or cutting operations which are to be subsequently carried out.

After a sufficient cooling time in which the thermoplastic material in the mold solidifies to such an extent that it can be mechanically loaded to a sufficient degree, the mold 18 is opened. For that purpose the two mold portions 18a, 18b are each moved into the respective positions shown in FIG. 2 so that the expanded article 20 can be removed therefrom. As the wall of the expanded article or hollow body 20 is not self-supporting, it may be desirable initially to maintain a certain increased pressure in the interior of the hollow body 20 in order to provide for improved handling thereof. That can also be effected for example by the compressed air feed into the preform 16 or the hollow body 20 produced therefrom being effected not by way of a nozzle of relatively large diameter as indicated at 24 in FIG. 1, but by way of a blowing nozzle in needle shape, which only causes a small hole in the wall of the hollow body 20, so that consequently pressure equalisation as between the interior of the hollow body 20 and the surrounding ambient atmosphere also lasts some time.

Figure 3:
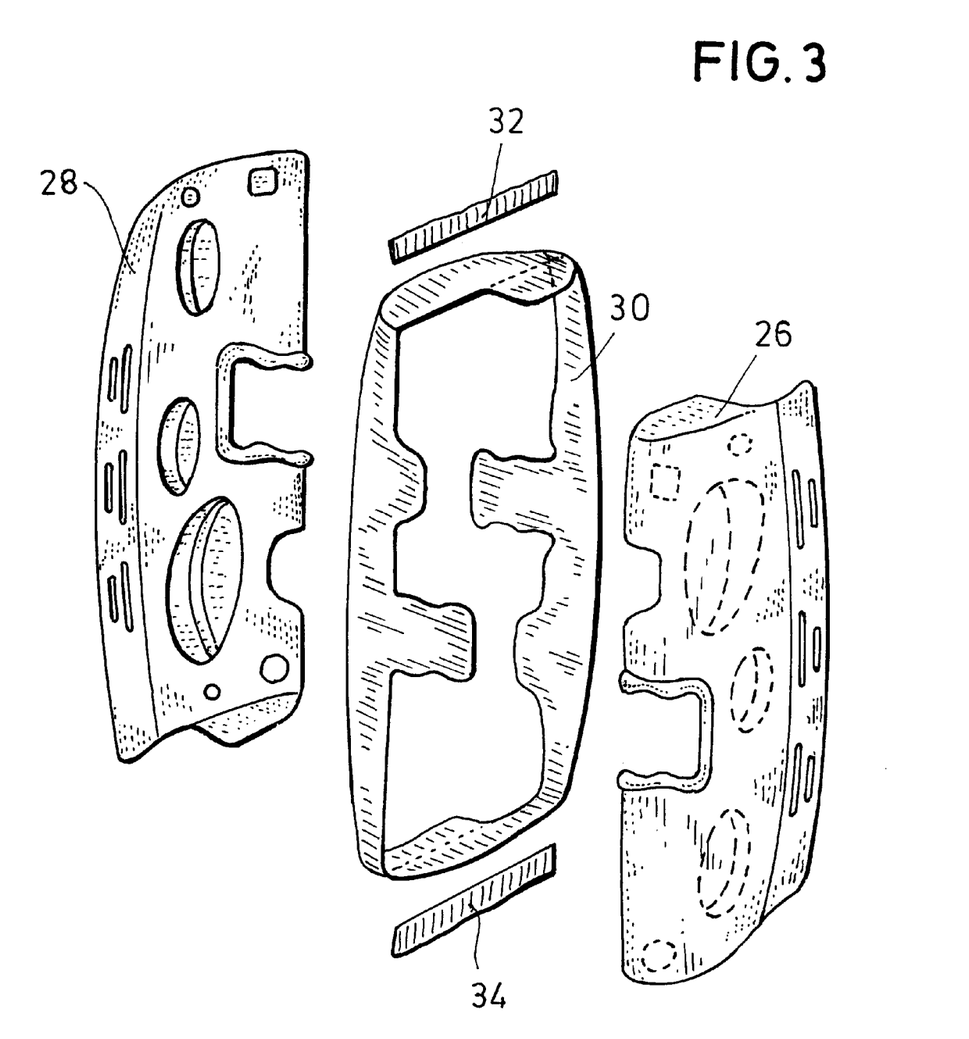
FIG. 3 is a perspective view showing the hollow body of FIG. 2 which is subdivided to produce two end products.

After it has sufficiently solidified the hollow body 20 can then be divided up in such a way that, as shown in FIG. 3, it affords first and second end products each in the form of a respective substantially smooth cover skin or shell 26, 28 which is virtually flat or slightly curved in large regions thereof and which, as already mentioned, may possibly be of different configurations from each other, together with a waste portion 30 which on the hollow body 20 produced in the blow molding procedure forms a region between the two portions 26 and 28 forming the end products or cover skins, and also together with two waste portions 32 and 34 which formed end sections on the preform 16 and on the inflated article or hollow body 20. The waste portions 30, 32 and 34 can be recycled to the extrusion system again after having been broken down into for example granular material in the usual manner.

Figures 4, 5:
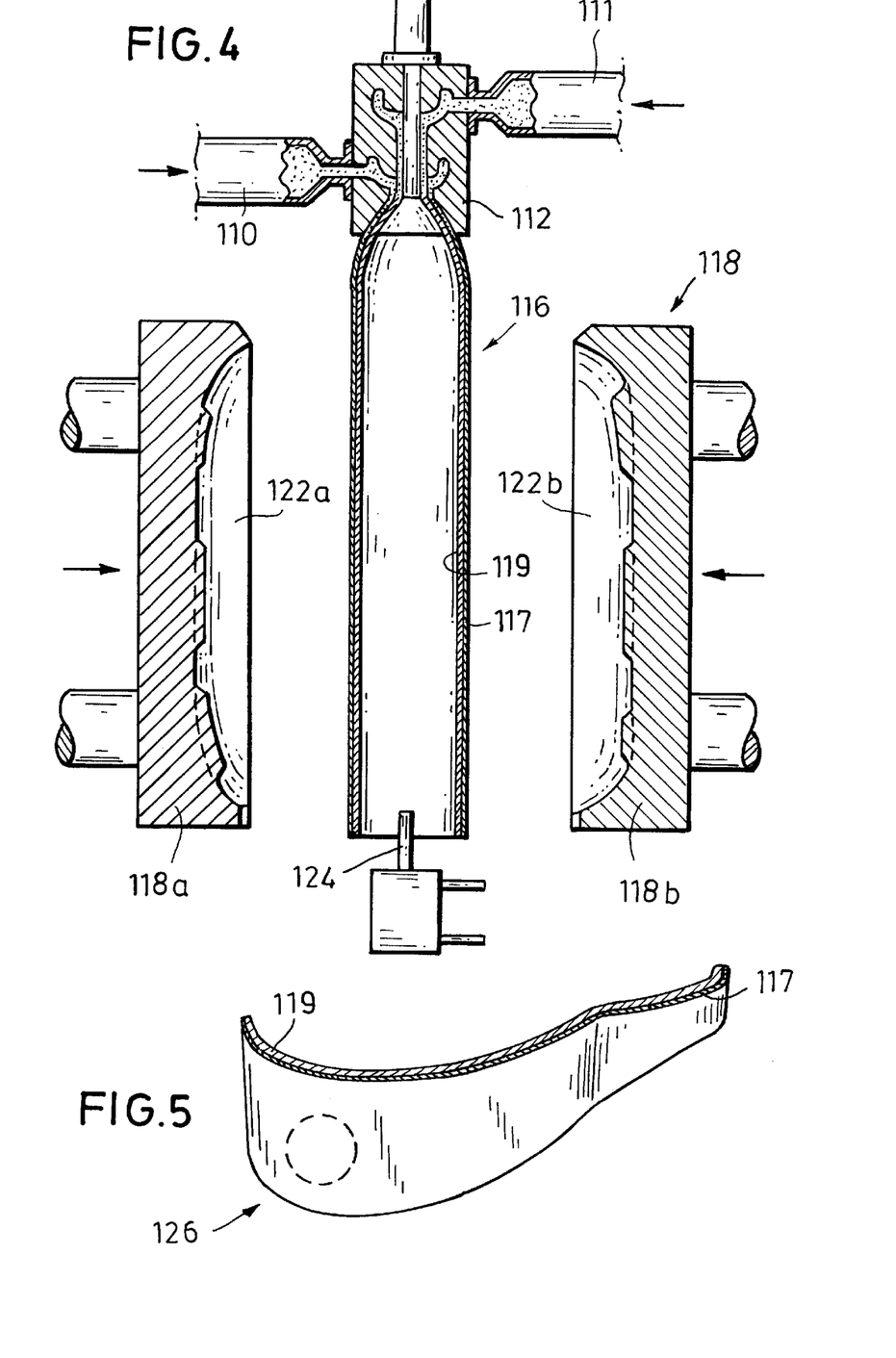
FIG. 4 is a view corresponding to FIG. 1 of a second embodiment of the invention.
FIG. 5 shows a portion from a finished product produced with the apparatus structure shown in FIG. 4, on a larger scale.

Referring to FIGS. 4 and 5, shown more particularly in FIG. 4 is an embodiment of an extrusion blow molding apparatus which is the same in regard to its essential parts as that shown in FIG. 1 so that the same parts and components are also denoted by the same reference numerals but increased in FIG. 4 by 100. The major difference between the embodiment of FIG. 1 and the embodiment shown in FIG. 4 is that in FIG. 4 two extruders 110 and 111 are operatively associated with the extrusion head 112, the extruder 110 being operable to process an aliphatic polyurethane and the extruder 111 being operable to process an aromatic polyurethane which are therefore both fed to the extrusion head 112 for co-extrusion therefrom. In that arrangement, the two flows of material coming from the extruders are guided in the extrusion head 112 in such a way that the two flows of material are put into an annular cross-sectional shape in the usual fashion, brought together and co-extruded in such a way that the aliphatic polyurethane forms the one layer, more specifically the outer layer 117 of the preform 116, while the flow of material consisting of aromatic polyurethane forms the other, inner layer 119 of the preform 116. The two layers 117 and 119 are bonded directly together as the two kinds of polyurethane material are compatible so that they can be welded to each other.

When the process involves discontinuous extrusion, the apparatus preferably has first and second storage spaces or chambers, one for each flow of material, and those storage spaces or chambers are emptied by a means such as a piston in the usual manner.

Discontinuous co-extrusion using one or more storage spaces or chambers is a procedure with which the man skilled in the art is generally familiar so that the specific design configuration of the extrusion head for discontinuous co-extrusion is not illustrated in detail herein. Suffice it to say that the illustrated apparatus structure produces a preform having an at least two-layer wall structure, wherein each layer of the wall structure comprises thermoplastic polyurethane and the at least two layers differ from each other by virtue of the properties of the polyurethanes involved.

In accordance with the structure of the preform 118, the finished article 126 produced therefrom is also of a two-layer structure in such a way that the outer layer 117 which in the installed condition for example in a motor vehicle is exposed to daylight comprises an aliphatic polyurethane whereas the layer 119 therebehind comprises an aromatic polyurethane. As already indicated above the two layers are directly welded together.

Figure 6:
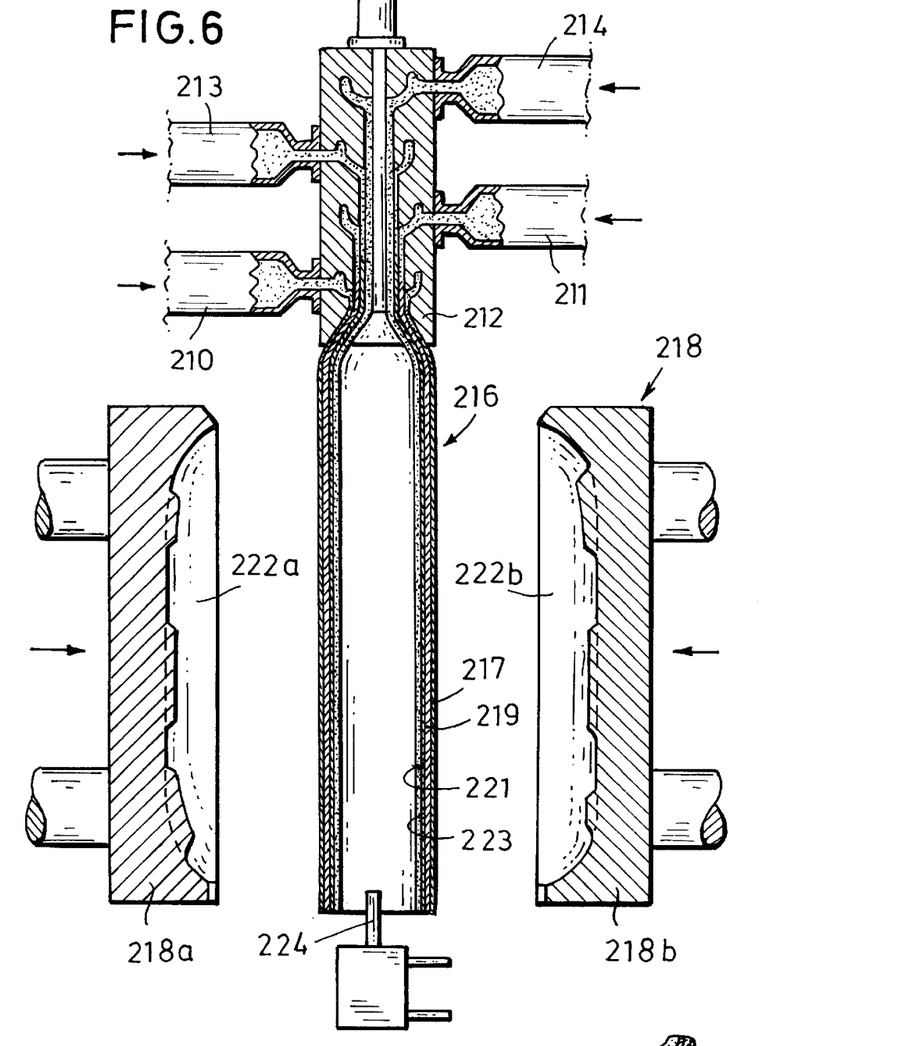
FIG. 6 is a view corresponding to FIG. 1 of a third embodiment of the invention.
Figure 7:
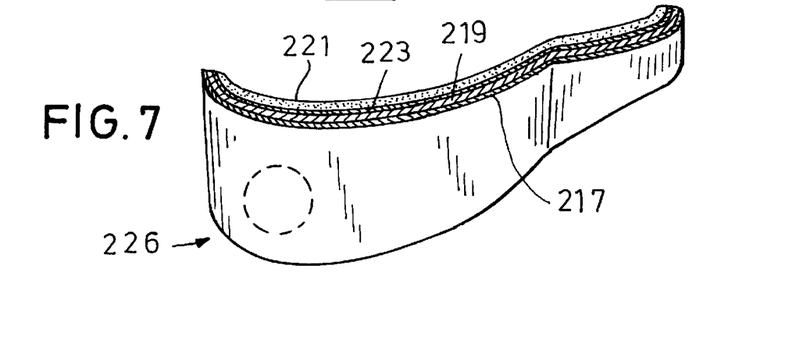
FIG. 7 is a view on an enlarged scale of a portion of a finished product produced using the apparatus structure of FIG. 6.

Reference will now be made to FIGS. 6 and 7 showing another embodiment of an extrusion blow molding apparatus for carrying out the process according to the invention. As shown more particularly in FIG. 6, the apparatus illustrated therein is also the same in terms of all its essential parts as the apparatus shown in FIG. 1 so that the same parts are denoted by the same references as in FIG. 1. but increased by 200. Four extruders 210, 211, 213 and 215 diagrammatically illustrated in FIG. 6 are operatively associated with the extrusion head 212. The extruders 210, 211 serve for processing and in particular plasticising two different kinds of polyurethane in such a way that, on the resulting preform as indicated generally at 216 in FIG. 6, the outer layer 217 comprises aliphatic polyurethane and the layer 219 directly adjoining same comprises aromatic polyurethane. The extruder 214 serves for processing a thermoplastic material, for example polyethylene, containing an additive which causes that plastic material to foam up. The layer 221 formed therefrom in the preform 216 results in the presence of a foam layer 221 on the finished article, as is illustrated in greater detail in FIG. 7. As polyethylene, or also many other plastic materials which fall to be considered for this purpose, cannot be welded to polyurethane and thus also cannot be welded to the layer 219 of aromatic polyurethane, it is necessary to arrange a layer 223 comprising a bonding agent or material between the layer 219 of aromatic polyurethane and the layer 221 of another foamed plastic material. The bonding material is processed in the extruder 213 of the extrusion head 212. In this case also extrusion can be effected in a continuous or discontinuous manner, with discontinuous extrusion being preferred at the present time.

It will be appreciated that it is also possible to provide a layer consisting of foamed plastic material, when using only a single polyurethane material, that is to say when the preform or hollow body produced therefrom has only one layer of polyurethane. The extrusion blow molding process also affords the option in all cases of selecting the thickness of that foamed layer on the finished article in dependence on the respective requirements involved so that it is possible in one working operation to produce a cover skin or film which, after it has been cut to size, can be applied without additional extensive working thereof, to the part which is to be covered by the cover skin or film.

At any event the processes in accordance with the invention as described hereinbefore make it possible to produce cover skins for instrument panels substantially less expensively than is hitherto the case.

It will be appreciated moreover that the above-described embodiments of the process according to the invention have been set forth solely by way of example and illustration of the principles thereof and that various other modifications and alterations may be made therein without thereby departing from the spirit and scope of the present invention.

What is claimed is:

1. A process for producing a cover skin of thermoplastic polyurethane for an instrument panel of a motor vehicle comprising
    producing a preform by extrusion of the thermoplastic polyurethane,
    the preform having a two-layer wall structure, each layer of the wall structure comprising thermoplastic polyurethane, the two layers differing from each other by virtue of the properties of the polyurethanes involved, and
    thereafter expanding the preform in a blow molding mold by an increased internal pressure in the preform.

2. A process as set forth in claim 1 wherein the preform is discontinuously extruded.

3. A process as set forth in claim 1 wherein the preform is extruded at a speed of between 10 and 40 cm/second.

4. A process as set forth in claim 3 wherein the preform extrusion speed is between 10 and 15 cm/second.

5. A process as set forth in claim 1 wherein processing of the thermoplastic material in the extruder is effected at a temperature of between 165° C. and 200° C.

6. A process as set forth in claim 1 wherein the thermoplastic polyurethane is processed in the extruder at a pressure of between 40 and 60 bars.

7. A process as set forth in claim 1 wherein polyester polyurethane is used.

8. A process as set forth in claim 1 wherein polyether polyurethane is used.

9. A process as set forth in claim 1 wherein the extruded preform is of a tubular shape.

10. A process as set forth in claim 1 wherein the thermoplastic polyurethane is fed to the extruder in granule form.

11. A process as set forth in claim 1 wherein the extruded preform has a wall thickness of about 2 mm and the expanded product produced by virtue of the increased internal pressure has a wall thickness of about 1 mm.

12. A process as set forth in claim 1 wherein the one layer of the two layers comprises aliphatic polyurethane and another layer of the two layers comprises aromatic polyurethane.

13. A process as set forth in claim 1 wherein a layer constituting an outer layer comprises aliphatic polyurethane and a layer constituting an inner layer comprises aromatic polyurethane.

14. A process as set forth in claim 1 wherein a layer constituting an outer layer is of a thickness of between 0.2 and 0.6 mm and a layer constituting an inner layer is of a thickness of between 0.8 and 1.8 mm.

15. A process as set forth in claim 1 wherein one layer comprises thermoplastic polyurethane and the other layer comprises a foamable thermoplastic polyurethane.

16. A process as set forth in claim 15 wherein the foamable thermoplastic polyurethane layer forms an inner layer of the preform.

17. A process as set forth in claim 15 wherein one layer comprises thermoplastic polyurethane and another layer comprises a foamable thermoplastic polyurethane, the two layers are joined together by a bonding agent layer.

18. A process as set forth in claim 1 wherein the expanded product obtained by expansion in the blow molding mold is divided to produce first and second end products.

19. A process as set forth in claim 18 wherein a hollow body is produced in the blow-molding mold by expansion of the preform, which hollow body includes an excess material region between the end products to be produced from the hollow body by a separation operation.

20. A process for producing a cover skin of thermoplastic polyurethane for an instrument panel of a motor vehicle comprising producing a preform by extrusion of a thermoplastic polyurethane, thereafter expanding the preform in a blow molding mold by an increased internal pressure in the preform, wherein the preform is produced having a two-layer wall structure with one layer comprising a thermoplastic polyurethane and the other layer comprising a foamable plastic material, the two layers joined together by a bonding agent between the thermoplastic layer and the foamable plastic material layer.

* * * * *